Dec. 12, 1967  J. DONOVAN ET AL  3,357,478
THIN FILM PROCESSING APPARATUS
Filed Dec. 5, 1966
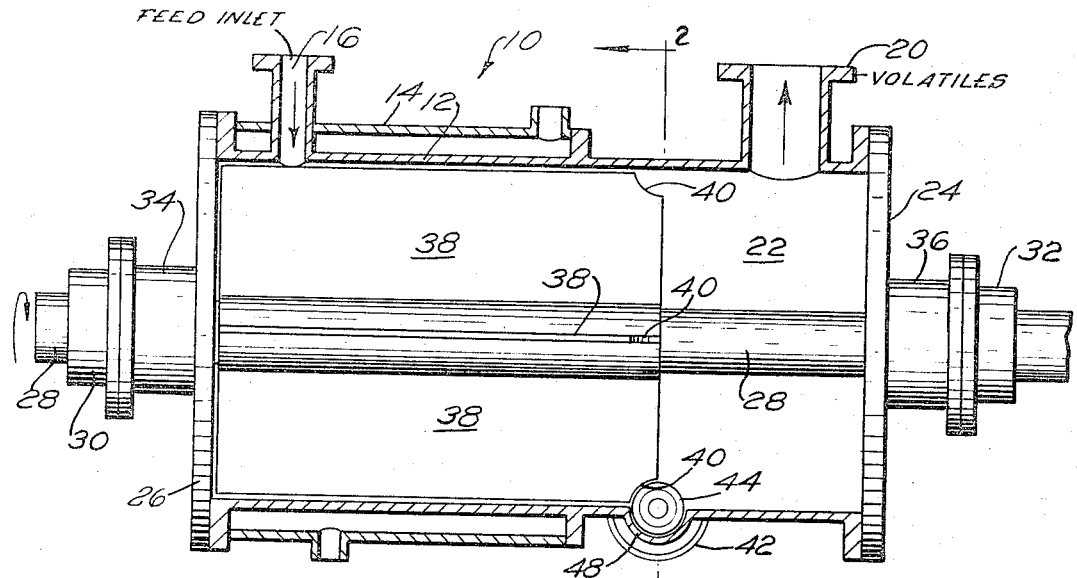
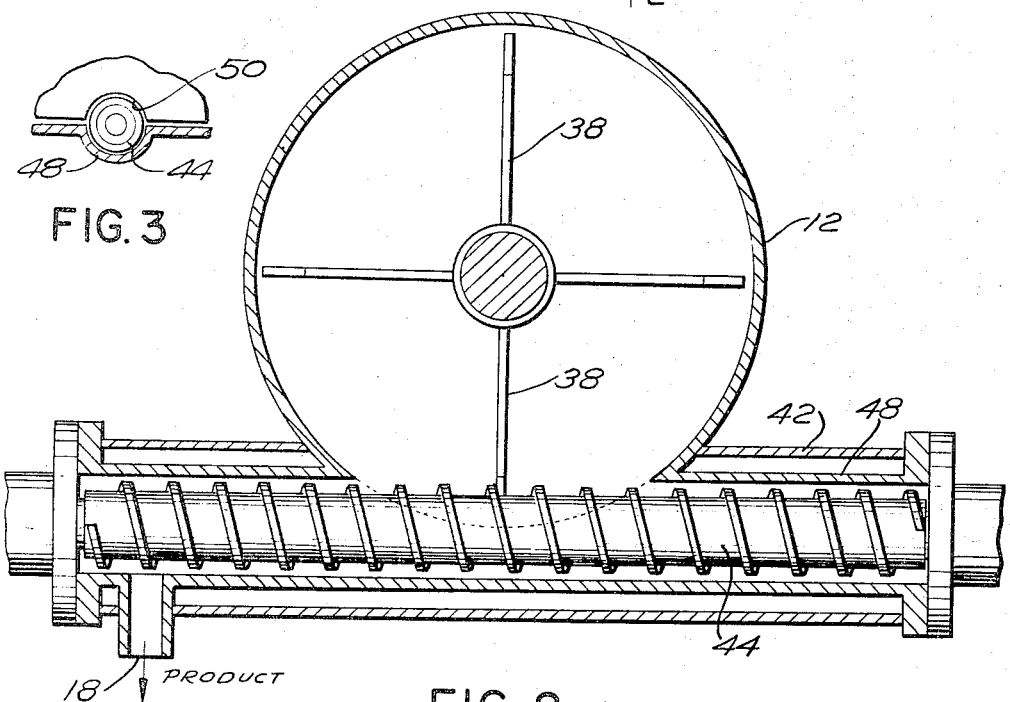
INVENTORS
JAMES DONOVAN
MAX MENDELSOHN
BY
Richard P. Crowley
ATTORNEY United States Patent Office 3,357,478
Patented Dec. 12, 1967

3,357,478
THIN FILM PROCESSING APPARATUS
James Donovan, Cambridge, and Max Mendelsohn, Mattapan, Mass., assignors to Artisan Industries, Inc., Waltham, Mass., a corporation of Massachusetts
Filed Dec. 5, 1966, Ser. No. 599,308
6 Claims. (Cl. 159—6)

ABSTRACT OF THE DISCLOSURE

A rotary, thin film type evaporator with rotor blades characterized by arcuate cut-out portions which cut-out portions are in a material-transfer relationship with an extruder or conveying means. The arcuate cut-out sections of the rotor blades which sections may be at the end of the blade or at any place along the entire length, lay down viscous material on an extruding or conveying means, which means generally includes a helical-type conveying worm to convey the viscous material from the evaporator.

Background of the invention

Our invention relates to an improved, rotary, thin film type fluid processing apparatus for the treatment, reaction or processing of fluids such as liquids, suspensions, slurries, emulsions, solutions, molten solvents, and the like. In particular, our invention relates to a wiped or turbulent, thin film evaporator which includes means to remove in an efficient and simple manner viscous or other material formed during the processing operation.

Thin film evaporators are often employed to concentrate polymeric or resinous materials, such as, for example, the removal of water from a rubber latex or in the desolventizing of a resin-solvent solution. In such an operation the feed material fed into the thin film type processing unit typically has a much lower viscosity than a product material removed from the product outlet. A rapid increase or change in viscosity, while processing, creates processing difficulties. For example, if the material becomes extremely viscous it tends to be more difficult to process and to move more slowly through the processing operation, thereby subjecting the material to a longer than desired residence time in the evaporator. Longer residence times are often undesirable due to the increased possibility of thermal degradation of the product material. Accordingly, it is most desirable to provide means to rapidly remove viscous material from the product end of a thin film apparatus. The material should be removed in a simple and efficient manner, which does not interefere with the primary function of evaporating or concentrating the material. In addition, a viscous material may tend to accumulate at the product end, and to build up on the end of the blades, thus causing a greater power consumption than desired.

Summary of the invention

We have now developed a new and improved means to remove viscous material from a thin film type processing unit in an efficient, simple and practical manner. The rotor blades of the thin film evaporator are characterized by arcuate cut-out portions either at the end of the rotor blades or at any portion along their entire length. Placed in a material transfer relationship with said arcuate cut-out portions of the rotor blades is an extruder or conveying means, which means include a helical type conveying worm. Maximum material transfer generally occurs when the helical type worm is perpendicular to the rotation of the blades. The viscous material is transferred from the arcuate cut-out portion to the helical worm onto the exposed portion of the helical worm and then conveyed out of the evaporator. In this manner the viscous material is removed in a simple and efficient manner.

It is, therefore, an object of our invention to provide an improved thin film apparatus which includes means to convey and remove from the apparatus a viscous product material which otherwise may be subject to longer residence times and increased thermal degradation.

Another object of our invention is to provide a thin film type evaporator of a horizontal or inclined type characterized by extruder means, whereby viscous material may be removed from the product outlet area in an efficient and practical manner.

These and other objects of our invention will be apparent to those persons skilled in the art from the accompanying drawing, and the following description of our invention wherein:

Brief description of the drawing

FIG. 1 is a schematic, longitudinal section through a cylindrical, rotary wiped, thin film evaporator of our invention;

FIG. 2 is a sectional end view along lines 2—2 of FIG. 1;

FIG. 3 is a fragmentary view of the extruder means when it is placed in a position other than at the end of the rotor blade.

Briefly, our invention comprises in unique and particular combination a thin film type evaporator with an extruding or conveying means. The evaporator comprises a closed chamber having an interior wall, a rotor located within the chamber, means to rotate the rotor and generally radially and axially arranged rotor blades on the rotor extending from the axis into a close, thin film association with the interior wall of the chamber. The evaporator will include additionally a feed inlet for the introduction of feed materials, a product outlet for the removal of viscous product material, and extruder means to carry the product material from the evaporator. In our evaporator a particular cut-out segment will be made in vessel wall and rotor blades to accommodate a conveying means including a helical material-carrying worm which is placed in close-fitting relationship with the cut-out segment of the rotor blades.

In operation the less viscous material, if any, is permitted to be discharged through the product outlet in the normal manner, while viscous material is directed by rotor blade onto a conveying means in a buttering-on or laying down manner as the rotor blades rotate which the conveying worm then carries out to the product outlet. The conveying worm is driven so that viscous material tending to accumulate at the product end of the evaporator on concentration will be conveyed or extruded or driven outwardly from the closed chamber such as through the product outlet. In this manner a versatile and flexible apparatus is provided whereby viscous product material and less viscous product material is efficiently removed. Our evaporator is particularly useful in connection with the processing of rubbery elastomers, either in solvent or emulsion form, or of resins or other polymeric materials in solutions, suspensions, slurries or the like, i.e., those materials which, on processing, are subject to a significant change in viscosity from a less viscous to a more viscous material.

Our invention will be described in connection with a horizontal-axised, rotary, wiped, thin film type evaporator wherein a vapor is generated during the processing operation following the same direction as the product, i.e., concurrent with respect to the feed material. Of course, our invention may also be employed in those evaporators wherein the flow of the vapor to the liquid feed is counter-current, as well as in conical type evaporators having, for example, a larger diameter at the feed end than at the product end (see U.S. Patent No. 2,927,634). FIGS. 1 and 2 show a horizontal-axised, cylindrical evaporator 10 comprising a closed, cylindrical chamber 12 having interior walls and surrounded to all or part of its length by a temperature control jacket 14 which is adapted for the introduction of a heating or cooling heat exchange fluid such as steam, cold water or the like. Chamber 12 is further characterized by a feed inlet 16 for the introduction of a feed material by pump, gravity or vacuum to be processed through the evaporator, a product outlet 18 at the opposite end thereof for the removal of the product material, and a vapor outlet 20, which vapor outlet exends into a vapor chamber 22 adjacent the product end of the evaporator 10. Closing heads 24 and 26 are secured to either end of the chamber 12, and support a horizontally inclined, central-axised, tube-like rotor shaft 28, which extends from the one end to the other end of chamber 12, and through the vapor chamber 22. The rotor 28 is driven by a motor or other means (not shown), and generally extends outwardly from each end of the closing heads. The rotor 28 extends through suitable bearings 30 and 32, and seals or packing material 34 and 36 are disposed at either end of the evaporator 10. The rotor shaft 28 is mounted for axial displacement or adjusts by any desired or convenient means, which may include a series of grooves or threads, which adjust the rotor shaft with respect to the end plates 24 and 26. Extending axially along and radially outward from the rotor shaft 28 are a plurality of four, as shown, or more of radial rotor blades 38, the blade tips of which extend into a small but generally uniform, closely spaced relationship with respect to the interior wall of the chamber 12, so that upon rotation of rotor shaft 28, the rotor blades 38 provide a thin, wiped or turbulent film of the processed material on the interior wall of chamber 12.

The rotor blades 38 are characterized by a cut-out segment therein to accommodate the fitting of a conveying means into a close material transfer relation with the cut-out segment. As shown, a 90° arcuate segment 40 has been cut out from the one end of each rotor blade 38, and directly above and adjacent the conveyor worm 44. Located adjacent the cut-out sections 40 of the rotor blades 38 is an extruder means, which comprises an extruder jacket 42, a helical type or worm type screw 44, a motor or other means (not shown) to drive the extruding screw 44, and an extruder nozzle 48. The extruding means extends substantially at right angles from the axis of the rotor 28. The helical material-conveying worm 44 is placed so that the cut-out segments 40 of each of the rotor blades 38 fit closely to the top of the exposed extruder worm 44 as it passes through the closed chamber 12 of the evaporator 10. A protective jacket 42 covers those portions of the extruder worm outside the closed chamber 12 of the evaporator 10. The edge of the cut-out section 40 must have a close-fitting relationship along its entire edge with the circumference of the extruder worm 44 in order to achieve maximum material transfer. This maximum material transfer is reached when the axis of the rotor blade 38 is substantially at right angles to the horizontal plane of the extruder means. A small clearance is provided between the rotor blades 38 and cut-out segments 40, and the worm 44 for expansion and adjustment purposes during operation of the evaporator.

In the operation of our evaporator 10 a material to be concentrated by the evaporator is introduced into the feed inlet 16 with volatile matter removed from the vapor outlet 20. As the material progresses through the evaporator 10, it becomes more viscous in character, so that upon reaching the product outlet 18 at the one end of the evaporator 10, the material is picked up by the rotating blades 38 and as it moves into the cut-out section 40 it is then laid down on top of the exposed, close-fitting segment of the worm 44, which is in close-fitting relationship with the cut-out section 40 of blade 38. The extruder screw is operated by a motor or other means, so as to convey material by means of the worm 44 outwardly from the evaporator and into the product outlet 18. The worm may be operated in conjunction with the rotor 28, or may be operated independently thereof so that the operation of the worm 44 can be adjusted so as to vary the amount of viscous material being removed from the evaporator. As shown, our evaporator provides that material which is not too viscous in nature may be discharged concurrently from the product outlet 18 in accordance with conventional operating manner. However, where viscous material is encountered, the cut-out segments of the rotor blades 38 will convey the material to the top of the exposed screw 44 located within the chamber 12, and permit such material to be carried away at the desired speed as set by the driving motor. The extruder means should be placed at substantially right angles with the rotor axis 28 in order to provide that the viscous material on the rotor blade tips, and the curved section 40 is directed to the exposed worm 44.

Our invention has been described in particular with the arcuate cut-out portions of the rotor blade being in a close-fitting relationship with the exposed portion of the extruder worm. However, it is to be realized that the relationship between the cut-out segment of the rotor blade and extruder worm need not necessarily be close-fitting to have a material transfer relationship. For example, the extruder worm could be some distance from the cut-out segment of the rotor blade and as the material accumulated in the cut-out arcuate sections of the rotor blade the extruder worm could remove such material as it accumulates.

Further, our apparatus has also been described in particular with an arc-shaped segment 40 at the extreme end of the rotor blades 38. However, the cut-out segment may be modified so that it is any arcuate shape, and placed anywhere in the blade. FIG. 3 illustrates the use of a 180° arcuate segment 50 in the rotor blade 38 in a material transfer relationship with the extruder means 44. For example, the arcuate segment 50 may be placed at the product end of the blade such as adjacent the product outlet. Our arcuate segment 50 may also be placed just before means to prevent material from entering the vapor chamber or before means diverting material back toward the product outlet.

Our extruding means may be operated in conjunction with a conventional product outlet or placed slightly beyond the product outlet if this is desirable, and may also be operated without a protective jacket covering the extruder means.

Our invention, as illustrated and described, avoids many of the difficulties associated in the past with the processing of viscous materials, and provides significantly improved and efficient results in which viscous material may be readily removed from a thin film processing unit.

What we claim is:

1. An improved fluid processing apparatus of a rotary, thin film type which apparatus comprises in combination:
    (a) a closed chamber characterized by an interior wall which is a surface of revolution whose elements are straight lines;
    (b) a rotor within the chamber;
    (c) means to rotate the rotor;
    (d) rotor blades secured to the rotor for rotation therewith, the blades generally radially and axially arranged from the rotor and extending into a close relationship with the interior wall of the chamber to form a small space between the outer edges of the blades and the interior wall, each said blade further characterized by having a predetermined shaped cut-out area lying in the longitudinal peripheral edge of the blade in a given transverse plane of the rotor axis;
    (e) an inlet at one end of the chamber for the introduction of feed material to be processed;

(f) an outlet in the chamber spaced axially downstream from the inlet for the removal of processed material from the chamber; and (g) extruding means which means comprise an elongated worm for conveying viscous or other material from the chamber, said axis of the worm being placed at substantially a skew right angle to the rotor axis and pentrating said wall substantially tangentially to intercept the swept out annular region of the cutout areas of the rotor blades, and into a material receiving relationship with the cut-out areas, means for discharging the viscous or other material from said worm, and driving means to drive said worm whereby the material is transferred from the the cut-out edges of the cut-out areas of the blades during rotation of same to the worm and by the worm from the closed chamber.

2. The apparatus of claim 1 wherein the cut-out areas of the blades are arcuate in shape and circumscribe the exposed section of the helical-type worm.

3. The apparatus of claim 2 wherein the cut-out portions of said blades is a 90 degree arcuate cut-out portion at the product end of the blade.

4. The apparatus of claim 2 wherein the arcuate cut-out areas of said blades are 180 degree arcuate cut-outs.

5. The apparatus of claim 2 wherein the arcuate cut-out portion and circumscribed worm are located directly adjacent the product outlet.

6. The apparatus of claim 1 wherein the means to drive the worm is driven independently of the rotor axis, whereby the speed of conveying the viscous material from the interior of the chamber to the product outlet may be varied.

References Cited
UNITED STATES PATENTS

| | | | |
|---|---|---|---|
| 426,361 | 4/1890 | Buttner et al. | 34—182 |
| 1,188,220 | 1/1940 | Carlson | 159—10 |
| 3,225,715 | 12/1965 | Page | 18—12 X |

NORMAN YUDKOFF, *Primary Examiner.*

J. SOFER, *Assistant Examiner.*